(12) United States Patent
Santais et al.

(10) Patent No.: US 10,807,297 B2
(45) Date of Patent: Oct. 20, 2020

(54) MAINTENANCE METHOD FOR AN INSTALLATION FOR FORMING CONTAINERS, INCLUDING A RESYNCHRONIZING PROCEDURE

(71) Applicant: SIDEL PARTICIPATIONS, Octeville-sur-Mer (FR)

(72) Inventors: Franck Santais, Octeville-sur-Mer (FR); Fabian Petit, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 206 days.

(21) Appl. No.: 16/042,428

(22) Filed: Jul. 23, 2018

(65) Prior Publication Data
US 2019/0022917 A1 Jan. 24, 2019

(30) Foreign Application Priority Data

Jul. 21, 2017 (FR) ..................................... 17 56946

(51) Int. Cl.
*B29C 49/06* (2006.01)
*B29C 49/78* (2006.01)
(Continued)

(52) U.S. Cl.
CPC ............ *B29C 49/78* (2013.01); *B29C 49/062* (2013.01); *B29C 49/36* (2013.01); *B29C 49/42* (2013.01); *B29C 49/4205* (2013.01); *B29C 49/06* (2013.01); *B29C 2049/4231* (2013.01); *B29C 2949/7821* (2013.01);
(Continued)

(58) Field of Classification Search
CPC ...................... B29C 49/062; B29C 2049/4231
See application file for complete search history.

(56) References Cited

U.S. PATENT DOCUMENTS

| 1,601,836 A * | 10/1926 | Stenhouse | ............... C03B 9/195 65/231 |
| 1,642,660 A * | 9/1927 | O'Neill | ................. C03B 9/1955 65/241 |

(Continued)

FOREIGN PATENT DOCUMENTS

| DE | 10 2013 014618 A1 | 3/2015 |
| DE | 10 2014 005321 A1 | 10/2015 |
| DE | 10 2014 012528 A1 | 3/2016 |

OTHER PUBLICATIONS

FR Search Report, dated Mar. 13, 2018, from corresponding FR 1 756 946 application.

*Primary Examiner* — Cachet I Proctor (57) ABSTRACT

Disclosed is a maintenance method for an installation for production of containers from blanks made of plastic material, which includes: a blow-molding machine including a rotating carousel and a plurality of forming stations, each including a mold; a primary power unit connected to the carousel; a transfer device suitable for inserting a blank into a mold or for withdrawing a container therefrom; and a secondary power unit connected to the transfer device. The method includes the detection of a misalignment of the transfer device with the carousel, and, therefore, operations for desynchronization of the power units, for realigning and then for resynchronization of the transfer device and of the carousel.

8 Claims, 7 Drawing Sheets

(51) Int. Cl.
  *B29C 49/36* (2006.01)
  *B29C 49/42* (2006.01)
  B29K 67/00 (2006.01)
  B29L 31/00 (2006.01)

(52) U.S. Cl.
  CPC ........... *B29C 2949/78563* (2013.01); *B29K 2067/003* (2013.01); *B29L 2031/712* (2013.01)

(56) References Cited

U.S. PATENT DOCUMENTS

| | | | | |
|---|---|---|---|---|
| 2,715,751 | A * | 8/1955 | Weber | B29C 49/4205 264/530 |
| 4,214,860 | A * | 7/1980 | Kleimenhagen | B29C 49/12 425/149 |
| 4,726,756 | A * | 2/1988 | Aoki | B29C 49/6481 425/526 |
| 4,941,816 | A * | 7/1990 | Aoki | B29C 45/06 425/533 |
| 4,998,873 | A * | 3/1991 | Martin | B29C 49/36 425/450.1 |
| 5,429,651 | A * | 7/1995 | Bolin | B65G 47/82 198/430 |
| 5,585,065 | A * | 12/1996 | Nakamaki | B29C 49/16 264/521 |
| 5,785,921 | A * | 7/1998 | Outreman | B29C 49/48 264/529 |
| 8,651,853 | B2 * | 2/2014 | Dupuis | B29C 49/421 198/459.8 |
| 8,858,216 | B2 * | 10/2014 | Zoppas | B29C 49/36 425/533 |
| 9,925,713 | B2 | 3/2018 | Linke et al. | |
| 2003/0020193 | A1 * | 1/2003 | Hamamoto | B29C 49/4205 264/40.1 |
| 2008/0164279 | A1 * | 7/2008 | Chirnomas | G07F 11/62 221/123 |
| 2009/0139996 | A1 * | 6/2009 | Jacson | B29C 49/4802 220/771 |
| 2010/0151069 | A1 * | 6/2010 | Ng | B29C 49/4205 425/150 |
| 2012/0260955 | A1 * | 10/2012 | Winzinger | B29C 49/421 134/43 |
| 2014/0305076 | A1 * | 10/2014 | Winzinger | B29C 31/006 53/201 |
| 2015/0273754 | A1 | 10/2015 | Hahn | |
| 2016/0214306 | A1 * | 7/2016 | Linke | B29C 49/6409 |
| 2017/0028610 | B2 * | 2/2017 | Gerhards | B29C 49/4236 |
| 2017/0252960 | A1 * | 9/2017 | Baumgarte | B29C 49/42 |

* cited by examiner

MAINTENANCE METHOD FOR AN INSTALLATION FOR FORMING CONTAINERS, INCLUDING A RESYNCHRONIZING PROCEDURE

FIELD OF INVENTION

The invention relates to the production of containers from blanks made of plastic material such as PET. More specifically, the invention relates to the maintenance of an installation for production of containers.

BACKGROUND OF THE INVENTION

An installation for production of containers traditionally comprises a blow-molding machine equipped with a revolving carousel, and a plurality of forming stations each including a mold mounted on the carousel.

Each mold can assume an open position making possible the insertion of a blank (previously heated to a temperature greater than the glass transition temperature of the material—which is about 80° C. in the case of PET) and a closed position making possible the forming of a container from the blank by injection into it of a pressurized fluid (typically air). The opening and closing of each mold is generally assured by a mechanism with connecting rods, controlled by a cam.

The carousel is driven in a cyclical rotational movement by means of a primary power unit; for example, it involves a torque motor controlled by an electronic or computer control unit, which, by an encoder mounted on the carousel, is informed of its instantaneous angular position.

The installation generally comprises, upstream or, respectively, downstream from such a blow-molding machine, at least one transfer device including a wheel provided with a plurality of gripping elements (typically clamps), each able, during the rotation of the wheel, to be positioned at a transfer point where the gripping element is normally aligned on a mold to insert a blank therein or, respectively, to withdraw a container therefrom.

A secondary power unit is connected to the wheel—and synchronized with the primary power unit—to drive the wheel in a synchronized cyclical rotation with that of the carousel of the blow-molding machine.

The power unit can also be a torque motor controlled by the control unit, which, by an encoder mounted on the wheel, is informed of its instantaneous angular position, which makes it possible for it to ensure the synchronization of the wheel with the carousel.

The rates of production of such an installation are high. A blow-molding machine equipped with 20 forming stations produces about 40,000 containers per hour, or about 10 containers each second. In other words, each transfer is performed in about 1/10 of a second.

It is therefore essential that the synchronization of the carousel and of the wheel of the transfer device be accurate, so as to guarantee that a gripping element is correctly positioned in line with each mold at the point of transfer, and this at least 10 times per second.

Nevertheless, incidents happen. In particular, it happens that the mechanism for opening and closing a mold jams, for example when a foreign body comes between the mechanism and the cam, or else when a part, distorted by wear or strain, becomes deformed, cracks or breaks.

In such a situation, the blow-molding machine must be stopped immediately. The malfunction that caused the urgent stopping, or the stopping itself, may result in a misalignment of a transfer device in relation to the carousel (i.e., the gripping elements are no longer aligned with the molds at the point of transfer), which results in a desynchronization of the primary power unit and the secondary power unit.

The maintenance operations required by this situation are delicate and must be carried out carefully. The necks of the containers (or of the blanks) present in the molds located on either side of the point of transfer are obstacles to the free movement of the gripping elements, and are likely, during an uncontrolled rotation of the wheel of the transfer device, to damage the latter elements.

Also, before proceeding to the maintenance operations, the molds located upstream and downstream from the point of transfer should be manually emptied of their containers (or of their blanks).

However, the molds in the immediate vicinity of the point of transfer are inaccessible: the carousel must be rotated to free them. Now, such a rotation is dangerous because of the possibility of breaking the gripping elements for the reasons mentioned above.

BRIEF SUMMARY OF THE INVENTION

The invention aims to propose a solution eliminating the above-cited difficulties, as a result of a maintenance method that makes it possible to pivot the carousel and to empty the molds without the risk of damaging the gripping elements of the transfer device, and consequently making it possible to carry out the necessary maintenance operations without the risk of breaking.

For this purpose, a maintenance method for an installation for production of containers from blanks made of plastic material is proposed, which method comprises:

A blow-molding machine comprising a rotating carousel and a plurality of forming stations each including a mold that is mounted on the carousel and that can assume an open position to make possible the insertion of a blank and the withdrawal of a container, and a closed position to make possible the forming of a container from the blank;

A primary power unit connected to the carousel to drive it in a cyclical rotation;

A transfer device, which comprises a wheel provided with a plurality of gripping elements, each able, during the rotation of the wheel, to be positioned at a transfer point where the gripping element is normally aligned on a mold to insert a blank therein or to withdraw a container therefrom;

A secondary power unit connected to the wheel and synchronized with the primary power unit to drive the wheel in a cyclical rotation that is synchronized with that of the carousel;

A control unit connected to the power units;

this method comprising the following steps:

Detection of a misalignment of the gripping elements in relation to the molds;

Stopping of the carousel and of the wheel;

Desynchronization of the power units;

Definition, from a reference point connected with the carousel, of a resynchronizing zone positioned between two molds located, during the stopping, on either side of the transfer point;

Desynchronized partial rotation of the carousel and/or of the wheel, until placement of a gripping element in the resynchronizing zone;

Resynchronizing of the power units;

Synchronized rotation, by stepping, of the carousel and of the wheel to make possible the withdrawal of the blanks or of the containers from the molds near the transfer point;

Desynchronizing of the power units;

Desynchronized partial rotation of the carousel and/or of the wheel, until resetting the alignment of the gripping elements with the molds;

Resynchronizing of the power units.

According to a particular embodiment, these steps are, completely or partially, controlled by a push on a stepping controller, connected to the control unit.

The instantaneous angular position of the carousel and that of the wheel are preferably provided to the control unit by an encoder.

As for the resynchronizing zone, it is, for example, located equidistantly from two adjacent molds.

Other objects and advantages of the invention will be brought out in the description of an embodiment.

DETAILED DESCRIPTION

Partially represented in the drawings is an installation 1 for production of containers 2 from blanks 3 made of plastic material. According to an embodiment illustrated in the drawings, the blanks 3 are preforms, coming directly from an injection molding. However, in other embodiments, the blanks 3 could be intermediate containers, having undergone one or more preparatory operations (such as a pre-blow molding). The material is, for example, a polyethylene terephthalate (PET).

The installation 1 comprises, firstly, a blow-molding machine 4, equipped with a rotating carousel 5 and with a plurality of forming stations 6, each including a mold M mounted on the carousel 5 and that can assume:

an open position to make possible the insertion of a blank 3 and the withdrawal of a formed container 2, and a closed position to make possible the forming of a container 2 from a blank 3.

Figures 3, 4:
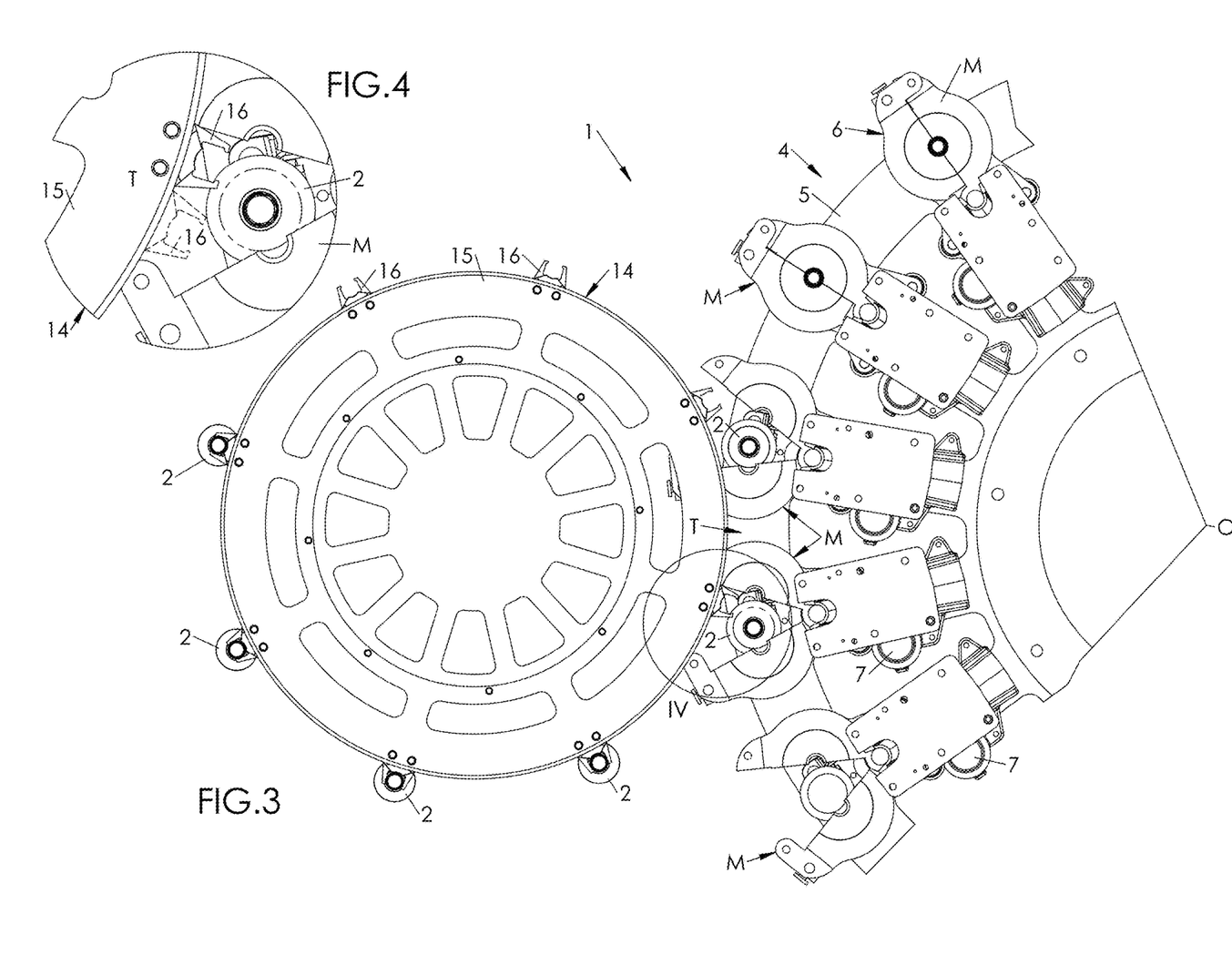
FIG. 3 is a partial top view of the installation of FIG. 1 and FIG. 2, illustrating a situation of accidental desynchronization of the carousel and of a transfer wheel.
FIG. 4 is a detail view, on a larger scale, according to the inset IV of FIG. 3, centered on a transfer point.

According to an embodiment illustrated in the drawings, and particularly in FIG. 3, each mold M comprises two half-molds that are joined around a hinge in order to be separated from one another (which corresponds to the open position of the mold M) or joined (which corresponds to the closed position of the mold M) to define together an impression of the container model to be formed.

Each mold M is equipped with a mechanism 7 for opening and closing (for example, with rods and cam).

Each forming station 6 further comprises a device for injection, into each blank 3 (previously heated and inserted into a mold M), of a pressurized fluid (for example, air) to deform the blank 3 until imparting to it the impression of the container model when it is flattened internally against the mold M.

Figure 2:
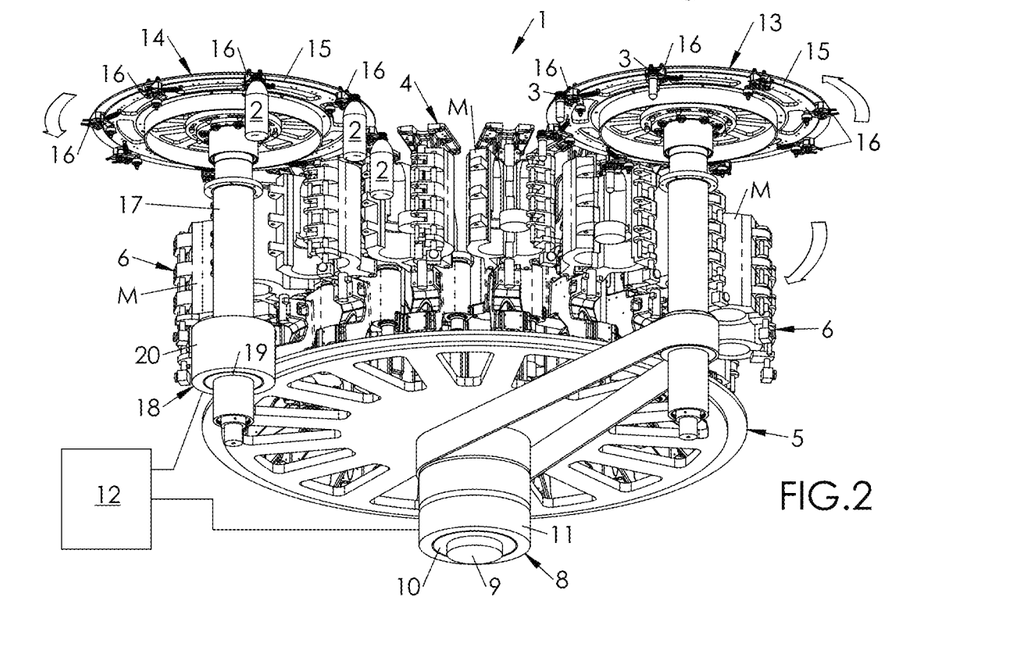

The installation 1 comprises, secondly, a primary power unit 8 connected to the carousel 5 to drive it in a rotating cyclical movement. As is seen in FIG. 2, the carousel 5 is provided with a central shaft 9: it is to this shaft 9 that the primary power unit 8 is connected.

According to a particular embodiment, the power unit 8 is of the torque motor type, i.e., it is a permanent-magnet brushless servomotor (also called a permanent-magnet synchronous motor, or else a direct-current brushless motor). Various models are particularly proposed by the Etel Company. This power unit 8 thus comprises a central rotor 10, mounted directly on the shaft 9 (and integral in rotation with it), and a peripheral stator 11.

According to an example embodiment, the primary power unit 8 comprises one or more windings integral with the stator 11, and a series of permanent magnets integral with the rotor 10. When electric current passes through the winding, it induces in the permanent magnets an electromotive force that drives the rotor 10 with a rotational movement whose speed is proportional to the intensity of the current.

The installation 1 comprises, thirdly, a (computer or electronic) programmable control unit 12, connected to the primary power unit 8.

In the embodiment illustrated, the control unit 12 is connected to the stator 11 to control the intensity of the current delivered to the winding. This control unit 12 comes, for example, in the form of a programmable logic controller (PLC), provided with control electronics (for example, a processor) and a man-machine interface (typically a screen associated with a keyboard, or optionally a touch screen) by which an operator can introduce instructions or view data related to the operation of the installation 1.

The installation 1 comprises, fourthly, at least one transfer device 13, 14, which comprises a wheel 15 provided with a plurality of gripping elements 16, each able, during the rotation of the wheel 15, to be positioned at a transfer point T where the gripping element is normally aligned with a mold M to insert a blank 3 therein or, respectively, to withdraw a container 2 therefrom.

Figure 1:
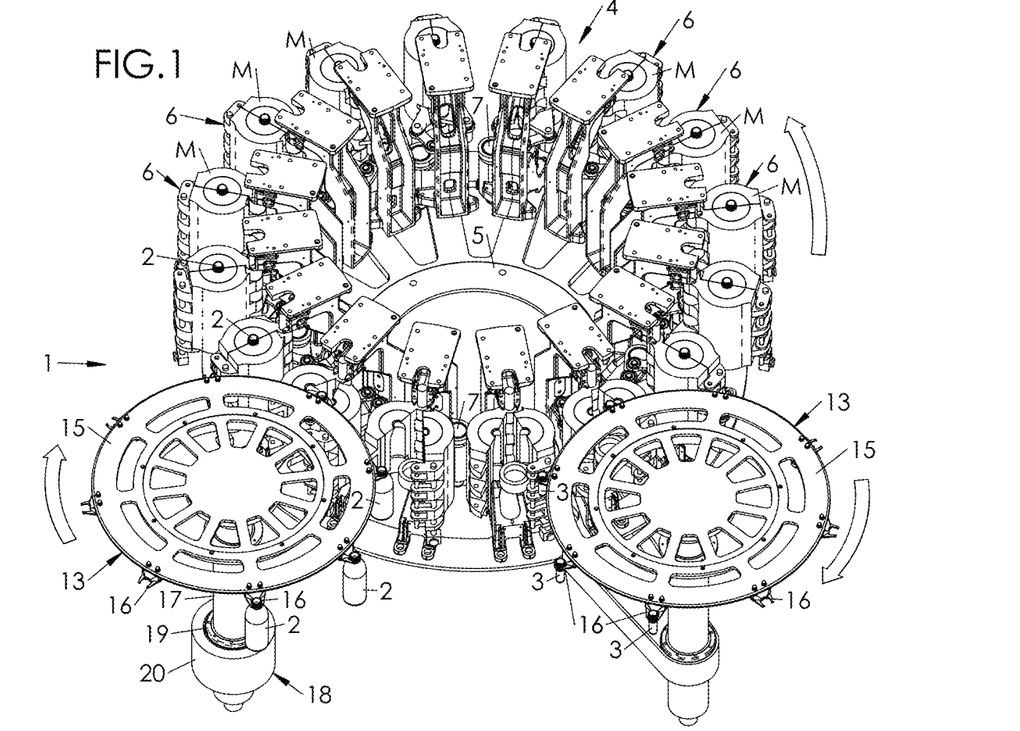
FIG. 1 and FIG. 2 are partial views in perspective, from two different angles, showing an installation for production of containers from blanks made of plastic material, which comprises a carousel equipped with a plurality of molds, and of wheels for transfer of the blanks and containers.

In the example illustrated in particular in FIG. 1, the installation 1 comprises two transfer devices, namely:

An upstream transfer device 13, designed and positioned to transfer blanks 3 to the carousel 5 for their forming into containers 2, and A downstream transfer device 14, designed and positioned to withdraw containers 2 from the carousel 5 for subsequent operations (such as filling, capping, labeling).

According to an embodiment illustrated in the drawings, and in particular in FIG. 2, FIG. 3, and FIG. 4, the wheel 15 is mounted on a rotating shaft 17, and the gripping elements 16 appear in the form of clamps distributed on the periphery of the wheel 15 and each provided with a pair of jaws able to snap onto the neck of a container 2 (or of a blank 3).

According to an embodiment illustrated in FIG. 2, at least the wheel 15 of the downstream transfer device 14 is moved in rotation by a secondary power unit 18 connected to (and controlled by) the control unit 12. The secondary power unit 18 is advantageously of the torque motor type and comprises a rotor 19 that is integral with the shaft 17 and a stator 20 connected to the control unit 12 that controls the intensity of the power current to it.

The control unit 12 is programmed to synchronize the rotation of the wheel (i.e., of the secondary power unit 18) to that of the carousel (i.e., of the primary power unit 8), in such a way that each gripping element 16 arrives systematically in line with a mold M to unload from it, on its opening, the container 2 only just formed.

For this purpose, the carousel 5 and the wheel 15 of the downstream transfer device 14 are both equipped with an encoder that furnishes to the control unit 12 the instantaneous angular position of the carousel 5 and, respectively, of the wheel 15.

In normal operation of the installation 1, the rotation of the wheel 15 of each transfer device 13, 14 (particularly of the downstream transfer device 14) is synchronized with that of the carousel 5, so that a gripping element 16 is positioned in the alignment of a mold M at each passage by the transfer point T.

Nevertheless, below, it is assumed that a(n) (accidental) misalignment of a wheel 15 (for example, that of the downstream transfer device 14) occurs in relation to the carousel 5, i.e., a misalignment of the gripping elements 16 in relation to the molds M. Specifically, the gripping elements 16 are either late or early for the molds M.

In the detailed inset of FIG. 4, shown in dashed lines is the normal position of a gripping element 16 in relation to a mold M, and in solid lines a misaligned position (corresponding to a desynchronization of the wheel 15 in relation to the carousel 5) in which the element 16 shown, considering the direction of rotation of the wheel 15 (clockwise in the turning selected in FIG. 4) and of the carousel 5 (counter-clockwise in this same turning), is early in relation to the mold M.

Described below is a maintenance procedure at the end of which the installation 1 is again ready for service.

A first operation consists in detecting the misalignment of the gripping elements 16 in relation to the molds M. This detection can be performed using sensors (for example, presence sensors) mounted on the wheel 15 or on the carousel 5. Nevertheless, this detection can be performed by simple comparison of the actual angular position of the wheel 15, as measured by its encoder and taken into account by the control unit 12, with the desired position that the wheel 15 is expected to occupy.

As soon as a difference exists between the actual angular position of the wheel 15 and its desired position, the control unit 12 concludes from this that a misalignment of the gripping elements 16 in relation to the molds M has occurred.

Below, and as illustrated in the drawings (in particular in FIG. 3 to FIG. 9), it is assumed that it is the downstream transfer device 14 that is misaligned.

Since the carousel 5 and the wheel 15 are always synchronized, continuing production without realigning the transfer device 14 with the carousel 5 can only lead to damaging parts of the transfer device 14 and/or of the carousel 5.

It is therefore necessary to interrupt the production by stopping the carousel 5 (and the wheel 15), so as to carry out a maintenance operation, and then to realign the wheel 15 with the carousel 5 before restarting the production.

This is why the following operation consists, for the control unit 12, in controlling the stopping of the carousel 5 and of the wheel 15.

This stopping can be performed by controlling torque motors 8, 18, which then behave like electromagnetic brakes. The stopping can optionally be completed by mechanical or fluid (hydraulic or pneumatic) braking.

Once the carousel 5 and the transfer devices 13, 14 are stopped, the installation 1 is secured and the maintenance operation, which requires the intervention of an operator, can be authorized.

Denoted are:
M1: the mold located immediately downstream from the transfer point T (in the direction of rotation of the carousel 5),
M2: the mold located immediately upstream, and
M3 and M4: the two following molds, located just upstream from the mold M2.

The molds M3 and M4 can (and must) be emptied of their respective containers 2 because, as we will see, the operations carried out during the maintenance are going to bring them in proximity to the transfer point T, with the danger that their respective containers 2 will interfere with the gripping elements.

Figure 5:
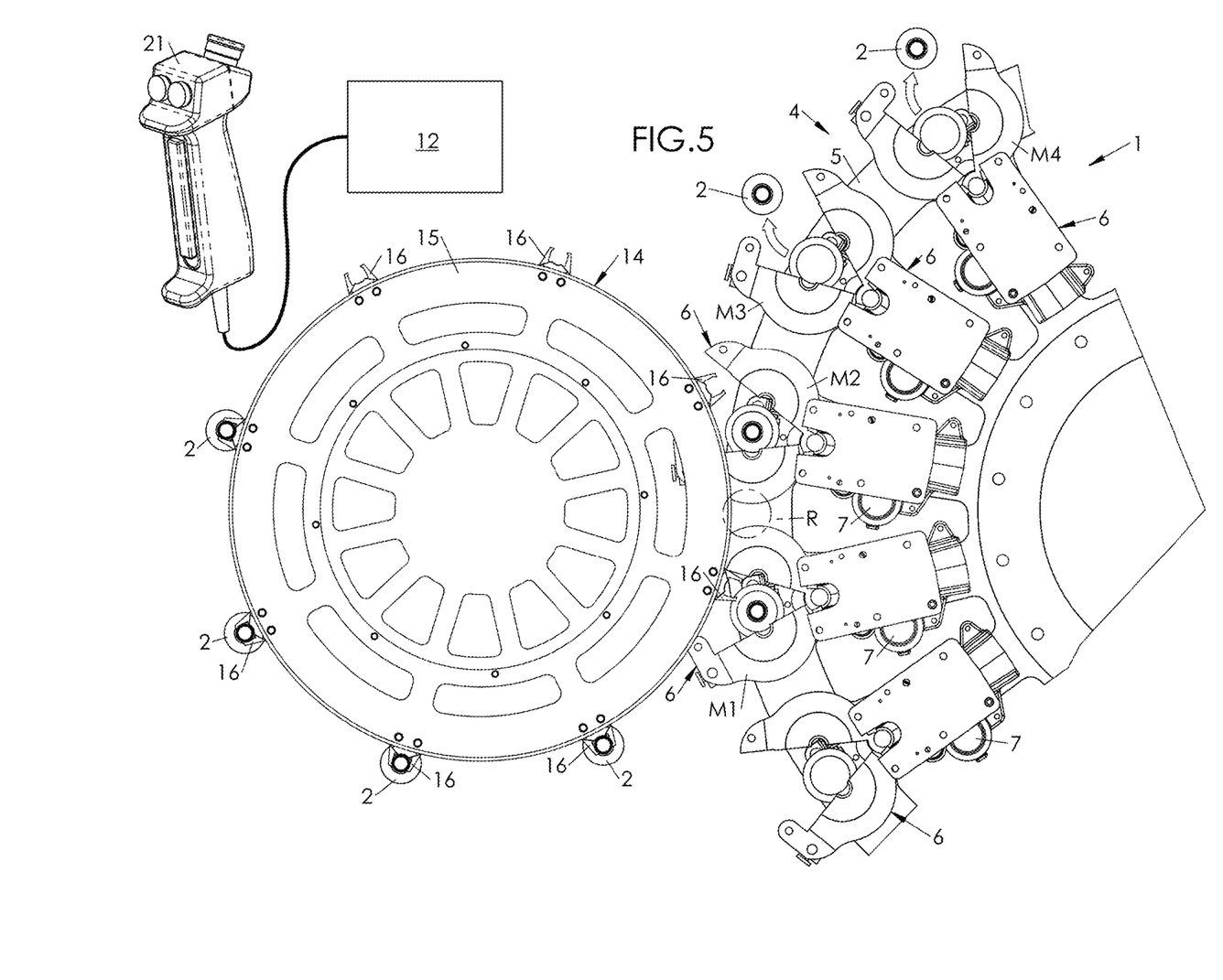
FIG. 5 is a view similar to FIG. 3, illustrating a step for connecting a remote stepper controller and a step for resynchronizing with the carousel of the forming machine.

The molds M3 and M4 are accessible, and their emptying can be performed by hand without it being necessary to call for a rotation of the carousel 5 or of the transfer device 14. The emptying of the molds M3 and M4 can nevertheless require their forced opening, which can be performed by an unlatching and a manual separation of the half-molds, as illustrated in FIG. 5.

However, as we have already explained, it is also necessary to empty the molds M1 and M2 located on either side of the transfer point T to avoid any substantive damage during the rotation (manually controlled, as we will see below) of the carousel 5 and/or of the wheel 15 of the transfer device concerned (here the downstream transfer device 14). This emptying cannot be performed, however, without imparting to the carousel 5 a rotation to bring first the mold M1, and then the mold M2, into a zone where the emptying can effectively be performed.

This rotation is controlled manually by the operator responsible for the maintenance. The term "manual" does not necessarily mean that it is by arm strength that the operator makes the carousel 5 pivot. In practice, it is preferable that this rotation be ordered by the operator by using a stepper remote controller 21, all being done by command from the control unit 12, so that this unit maintains awareness of the angular position of the carousel 5 and of the transfer device 14.

If the controller 21 is not already connected to the control unit 12, the operator is asked to do it, for example by using a message that is generated by the control unit 12 and that is displayed on its man-machine interface.

The connection of the controller 21, illustrated in the upper left corner of FIG. 5, is detected by the control unit 12.

The control unit 12 controls the desynchronization of the respective power units 8, 18 of the carousel 5 and of the transfer device 14.

Meanwhile, the control unit 12 remains connected to the encoders of the carousel 5 and of the transfer device 14, so that it is informed continuously of their respective instantaneous angular positions.

The transfer device 14 and the carousel 5 are going to be repositioned angularly in relation to one another so as to make possible their mutual rotation without the danger of substantive interference of the gripping elements 16 with the molds M. More specifically, this repositioning aims to position the gripping elements 16 in such a way that their passage by the transfer point T takes place, during the maintenance phase, in a so-called resynchronization zone R located between two successive molds M.

For this purpose, the control unit 12 defines, in a moving reference linked to the carousel 5, a resynchronization zone R that is positioned between the two molds M1, M2 that are located, during the stopping, on either side of the transfer point T.

The reference linked to the carousel 5 is a reference that can be defined by a central point O (located on the axis of rotation of the carousel 5) and a radial axis, perpendicular to the axis of rotation at the central point O.

According to an embodiment, the resynchronization zone R is located equidistant from two adjacent molds—in this instance, the two molds M1 and M2.

Figure 6:
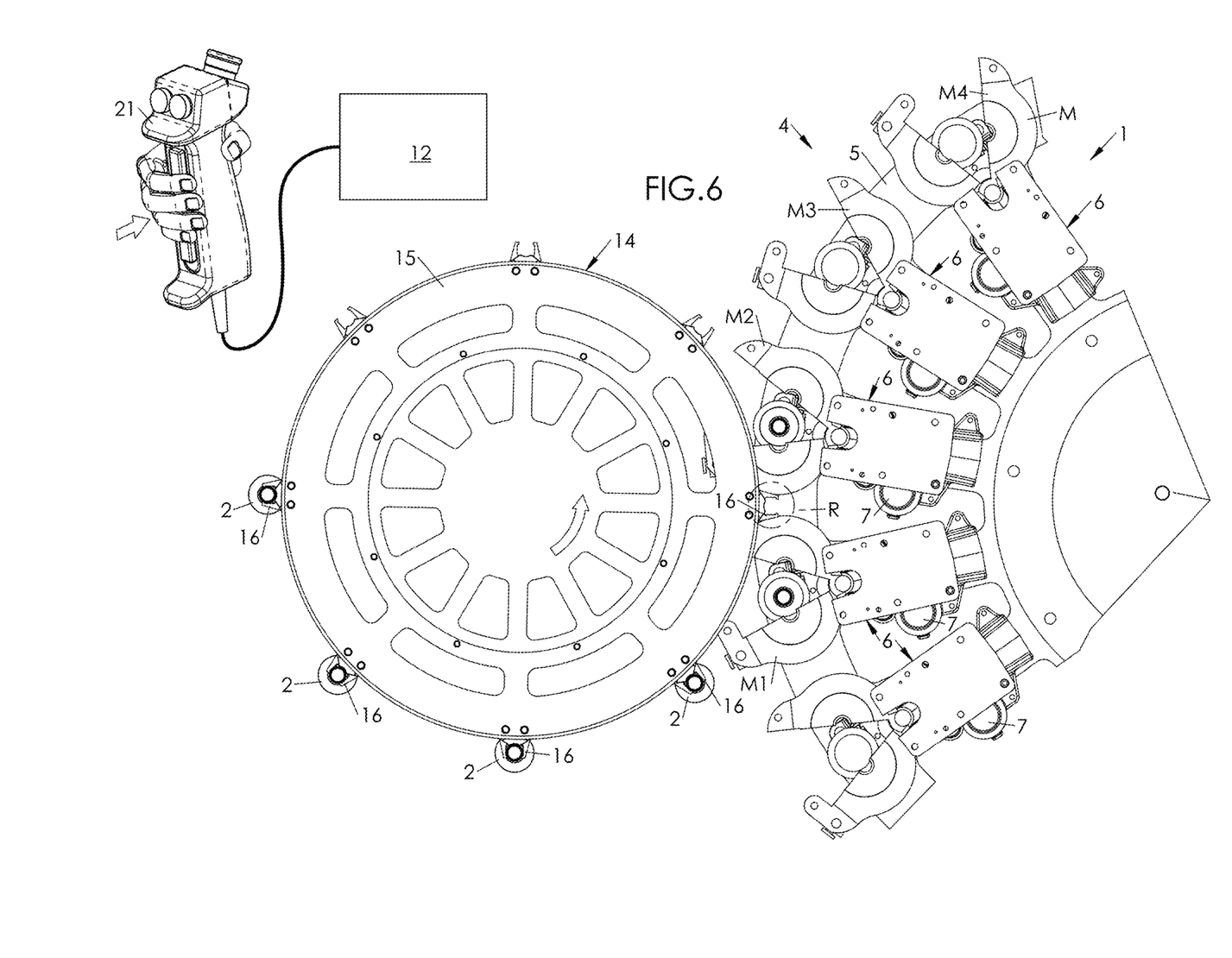
FIG. 6 to FIG. 9 are views similar to FIG. 5, illustrating the successive steps of a procedure for resynchronizing the blow-molding machine and the transfer device.

On the order of the operator, for example by a push given to the controller 21 (as illustrated in the upper left corner of FIG. 6), the control unit 12 then orders a partial rotation of the carousel 5 and/or of the wheel 15 until a gripping element 16 is placed in the resynchronization zone R. In practice, it is both the carousel 5 and the wheel 15 that must be pivoted until the resynchronization zone R, on the carousel 5, and a gripping element, on the wheel, are at the transfer point. In FIG. 6, a counter-clockwise rotation of the wheel 15 has been marked by a curved arrow.

This rotation is desynchronized, i.e., the carousel 5 undergoes a rotation that is independent from the wheel 15 and/or the wheel 15 undergoes a rotation that is independent from the carousel 5.

Meanwhile, the control unit 12 maintains angular position information relative to each of them.

At the end of this operation, the gripping element 16 is between the molds M1 and M2, approximately equidistant from each of them.

The power units 8, 18 are then resynchronized by the control unit 12, i.e., any rotation imparted to the carousel 5 is reflected by a simultaneous rotation of the wheel 15, by an angle proportional to the angle of rotation of the carousel 5, using the ratio of their respective diameters.

Figure 7:
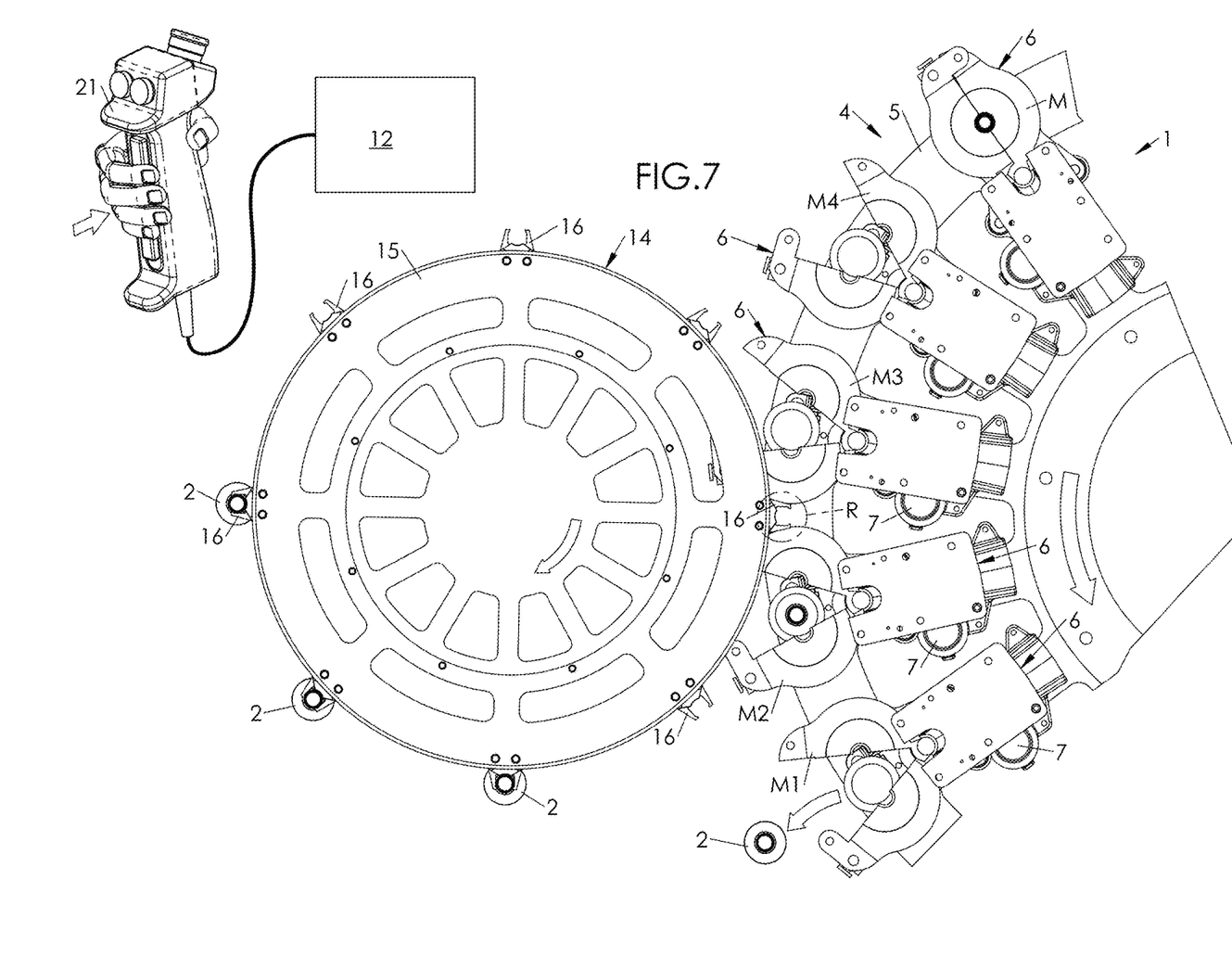

Then, on command from the operator by successive pushes on the controller 21, the control unit 12 orders a synchronized rotation, by stepping, of the carousel 5 and of the wheel 15 to make possible the withdrawal of the containers 2 (or the blanks 3) from the molds adjacent to the transfer point T:

First, the container 2 from the mold M1 (FIG. 7)

Figure 8:
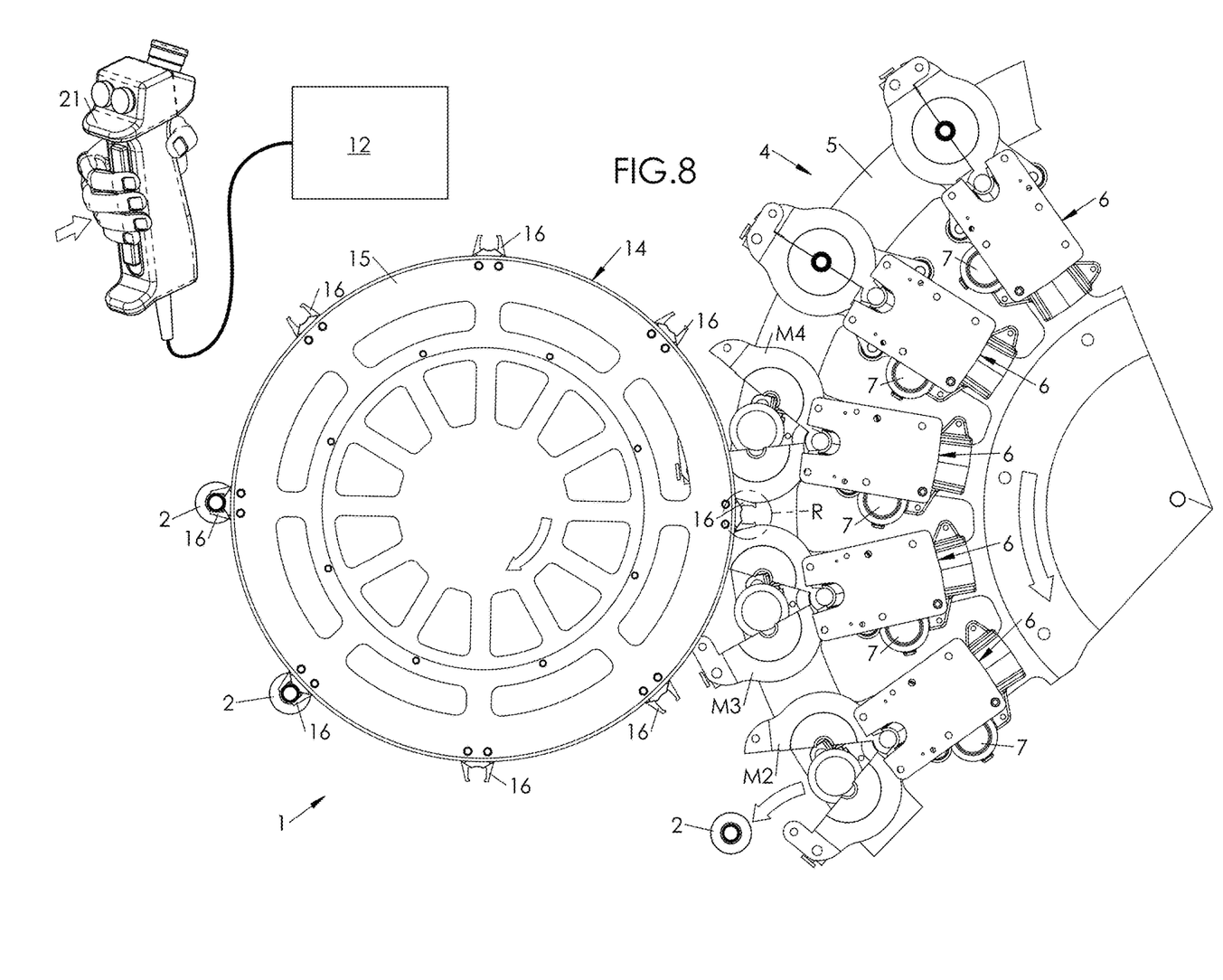

And then, the container 2 from the mold M2 (FIG. 8).

The term "by stepping" means that for each push on the controller, the carousel 5 undergoes a rotation by an angle corresponding to the angular distance between two adjacent molds M, while the wheel 15 undergoes a rotation by an angle corresponding to the angular distance between two adjacent gripping elements 16.

The carousel 5 and the transfer device 15 can then be repositioned so as to reset the gripping elements 16 in the alignment of the molds M.

For this purpose, the power units 8, 18 are again desynchronized by the control unit, on command of the operator by a push on the controller 21.

Figure 9:
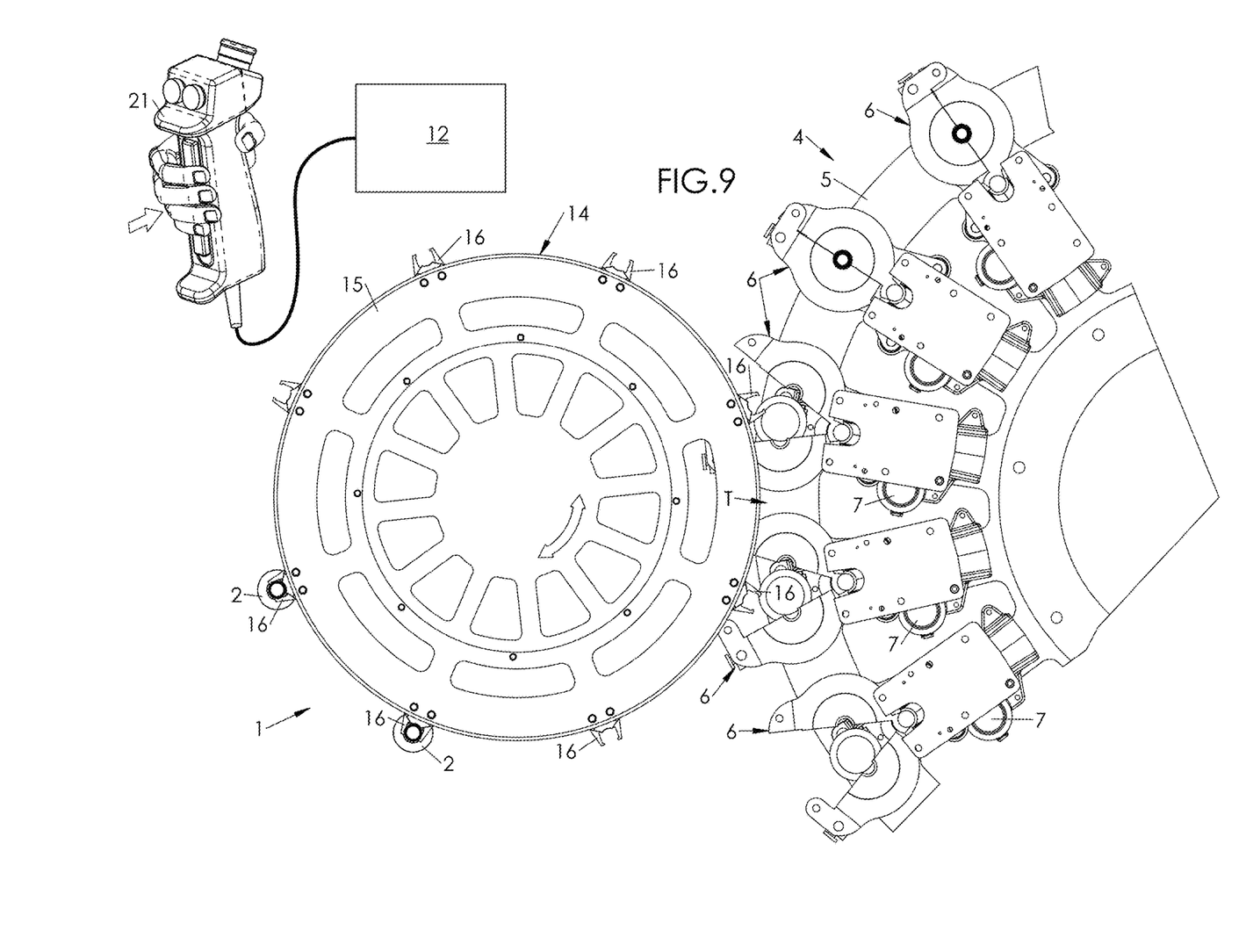

Then, by a new push on the controller 21, the control unit 12 orders a desynchronized partial rotation of the carousel 5 or of the wheel 15 (or of both) until resetting the alignment of the gripping elements 16 with the molds M (FIG. 9).

The control unit 12 then orders the resynchronizing of the power units 8, 18. Thus, during the joint rotation of the carousel 5 and of the wheel 15, the passages of a mold M and of a gripping element 16 at the transfer point T are simultaneous.

The maintenance operation (or operations) that are required for the restoration of the installation 1 (for example, the replacement of a defective component) can have been carried out before or during the procedure that has just been explained, or else after it, depending on the type and the location of this (these) operation(s).

The maintenance procedure that has just been described makes it possible to keep both the installation 1 and the operator safe, and this throughout the maintenance operations required by the incident that has led to the interruption of production.

In particular, it is possible to make the carousel 5 pivot and to empty the molds M without danger of damaging the gripping elements 16 that equip the transfer device 13, 14.

It will be noted that this description must not be considered as being limited to the embodiments described above by way of example, and that certain variants or alternatives within the scope of a person skilled in the art could be considered without going outside of the scope of the invention.

The invention claimed is:

1. Maintenance method for an installation (1) for production of containers (2) from blanks (3) made of plastic material, which comprises:
   a blow-molding machine (4) comprising a rotating carousel (5) and a plurality of forming stations (6), each including a mold (M) that is mounted on the carousel (5) and that can assume an open position to make possible the insertion of a blank (3) and the withdrawal of a container (2), and a closed position to make possible the forming of a container (2) from the blank (3);
   a primary power unit (8) connected to the carousel (5) to drive it in a cyclical rotation;
   a transfer device (13, 14), which comprises a wheel (15) provided with a plurality of gripping elements (16), each able, during the rotation of the wheel (15), to be positioned at a transfer point (T) where the gripping element (16) is normally aligned with a mold (M) to insert a blank (3) therein or to withdraw a container (2) therefrom;
   a secondary power unit (18) connected to the wheel (15) and synchronized with the primary power unit (8) to drive the wheel (15) in a cyclical rotation that is synchronized with that of the carousel (5);
   a control unit (12), connected to the power units (8, 18);
the method comprising:
   detection of a misalignment of the gripping elements (16) in relation to the molds (M);
   stopping of the carousel (5) and of the wheel (15);
   desynchronization of the power units (8, 18);
   definition, from a reference point connected with the carousel (5), of a resynchronizing zone (R) positioned between two molds (M1, M2) located, during the stopping, on either side of the transfer point (T);
   desynchronized partial rotation of the carousel (5) and/or of the wheel (15), until placement of a gripping element (16) in the resynchronizing zone (R);
   resynchronizing of the power units (8, 18);
   synchronized rotation, by stepping, of the carousel (5) and of the wheel (15) to make possible the withdrawal of the blanks (3) or of the containers (2) from the molds (M1, M2) near the transfer point;
   desynchronizing of the power units (8, 18);
   desynchronized partial rotation of the carousel (5) and/or of the wheel (15), until resetting the alignment of the gripping elements (16) with the molds (M);
   resynchronizing of the power units (8, 18).

2. Method according to claim 1, wherein the steps are, completely or partially, controlled by a push on a stepping controller (21), connected to the control unit (12).

3. Method according to claim 2, wherein the instantaneous angular position of the carousel (5) and that of the wheel (15) are furnished to the control unit (12) by an encoder.

4. Method according to claim 3, wherein the resynchronizing zone (R) is located equidistant from two adjacent molds (M1, M2).

5. Method according to claim 2, wherein the resynchronizing zone (R) is located equidistant from two adjacent molds (M1, M2).

6. Method according to claim 1, wherein the instantaneous angular position of the carousel (5) and that of the wheel (15) are furnished to the control unit (12) by an encoder.

7. Method according to claim 6, wherein the resynchronizing zone (R) is located equidistant from two adjacent molds (M1, M2).

8. Method according to claim 1, wherein the resynchronizing zone (R) is located equidistant from two adjacent molds (M1, M2).

* * * * *